(12) United States Patent
Hsiao et al.

(10) Patent No.: US 10,019,271 B2
(45) Date of Patent: Jul. 10, 2018

(54) DYNAMIC RUNTIME DATA COLLECTION AND PERFORMANCE TUNING

(71) Applicant: MediaTek Inc., Hsinchu (TW)

(72) Inventors: Li-Ting Hsiao, Zhubei (TW); Ying-Che Hsu, Hsinchu (TW); Shiyin Siou, Santa Clara, CA (US)

(73) Assignee: MediaTek, Inc., Hsinchu (TW)

( * ) Notice: Subject to any disclaimer, the term of this patent is extended or adjusted under 35 U.S.C. 154(b) by 356 days.

(21) Appl. No.: 14/864,357

(22) Filed: Sep. 24, 2015

(65) Prior Publication Data

US 2017/0090955 A1 Mar. 30, 2017

(51) Int. Cl.
| | | |
|---|---|---|
| *G06F 1/24* | (2006.01) | |
| *G06F 9/445* | (2018.01) | |
| *G06F 9/54* | (2006.01) | |
| *G06F 11/34* | (2006.01) | |
| *G06F 17/40* | (2006.01) | |
| *G06F 11/30* | (2006.01) | |

(52) U.S. Cl.
CPC .......... *G06F 9/44505* (2013.01); *G06F 9/542* (2013.01); *G06F 11/3024* (2013.01); *G06F 11/3452* (2013.01); *G06F 11/3476* (2013.01); *G06F 17/40* (2013.01); *G06F 2201/86* (2013.01)

(58) Field of Classification Search
None
See application file for complete search history.

(56) References Cited

U.S. PATENT DOCUMENTS

| | | | |
|---|---|---|---|
| 8,462,166 B2 | 6/2013 | Sowerby et al. | |
| 9,405,575 B2* | 8/2016 | Burka | G06F 11/3003 |
| 9,417,767 B2* | 8/2016 | Roy | G06T 15/005 |
| 2007/0300231 A1* | 12/2007 | Aguilar | G06F 9/4881 |
| | | | 718/104 |
| 2009/0089014 A1* | 4/2009 | Silyaev | G06F 11/348 |
| | | | 702/186 |
| 2012/0081377 A1* | 4/2012 | Sowerby | G06T 1/20 |
| | | | 345/522 |
| 2014/0089699 A1* | 3/2014 | O'Connor | G06F 1/324 |
| | | | 713/322 |

\* cited by examiner

*Primary Examiner* — Nitin Patel
(74) *Attorney, Agent, or Firm* — Tong J. Lee

(57) ABSTRACT

A device dynamically collects runtime data while the device is continuously executing an application to identify the cause of a performance bottleneck. The device hardware first collects data of high-level performance events that indicate alternative causes for the performance bottleneck. Based on real-time analysis of the data, a first performance event is identified among the high-level performance events for causing the performance bottleneck. The device hardware is then re-configured to collect additional data of lower-level performance events that are under the first performance event and indicate additional alternative causes more specific than the alternative causes. The collecting, identifying, and re-configuring are performed while the device is continuously executing the application.

16 Claims, 6 Drawing Sheets

DYNAMIC RUNTIME DATA COLLECTION AND PERFORMANCE TUNING

TECHNICAL FIELD

Embodiments of the invention relate to runtime data collection and performance tuning of a computing system.

BACKGROUND

As the complexity of modern computing systems increases, more and more unexpected performance events may occur in the systems to cause performance degradation, such as when a processor experiences low utilization or a cache experiences a low hit rate. A performance event is a cause for a performance bottleneck. A user may notice that an application takes a longer time to run but may not easily pin-point what event has occurred that causes the problem. Some modern computing systems are equipped with performance counters that can be configured to measure various aspects of performance, such as memory bandwidth or processor utilization. The runtime data is evaluated to determine the source of the problem. However, the number of available performance counters, as well as the buffer space for storing the counter data, is usually smaller than the possible performance events that may occur in the computing system.

To monitor a wide range of performance events, computing systems typically collect data for a subset of performance events at a time. Each time performance counters are configured for one subset of performance events and the application is restarted to collect data for the subset. A round-robin policy may be used to determine for which subset to collect data, and the application is restarted multiple times in order to cover all of the possible performance events. Repeatedly restarting an application at runtime is undesirable.

Therefore, improved tools are desired for detecting performance bottlenecks to optimize runtime performance of a computing system.

SUMMARY

In one embodiment, a method is provided for dynamic data collection in a device while the device is executing an application. The method comprises the steps of: collecting, by device hardware, data of high-level performance events that indicate alternative causes for a performance bottleneck; based on real-time analysis of the data, identifying a first performance event among the high-level performance events for causing the performance bottleneck; and re-configuring the device hardware to collect additional data of lower-level performance events that are under the first performance event and indicate additional alternative causes more specific than the alternative causes. The steps of collecting, identifying, and re-configuring are performed while the device is continuously executing the application is provided.

In another embodiment, a device is provided to perform dynamic data collection. The device comprises: one or more processors operative to execute an application; device hardware operative to collect data of high-level performance events that indicate alternative causes for a performance bottleneck during continuous execution of the application; a diagnostics module coupled to the device hardware and a re-configuration module coupled to the device hardware. The diagnostics module is operative to identify, based on real-time analysis of the data, a first performance event among the high-level performance events for causing the performance bottleneck during the continuous execution of the application. The re-configuration module is operative to re-configure, during the continuous execution of the application, the device hardware to collect additional data of lower-level performance events that are under the first performance event and indicate additional alternative causes more specific than the alternative causes.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
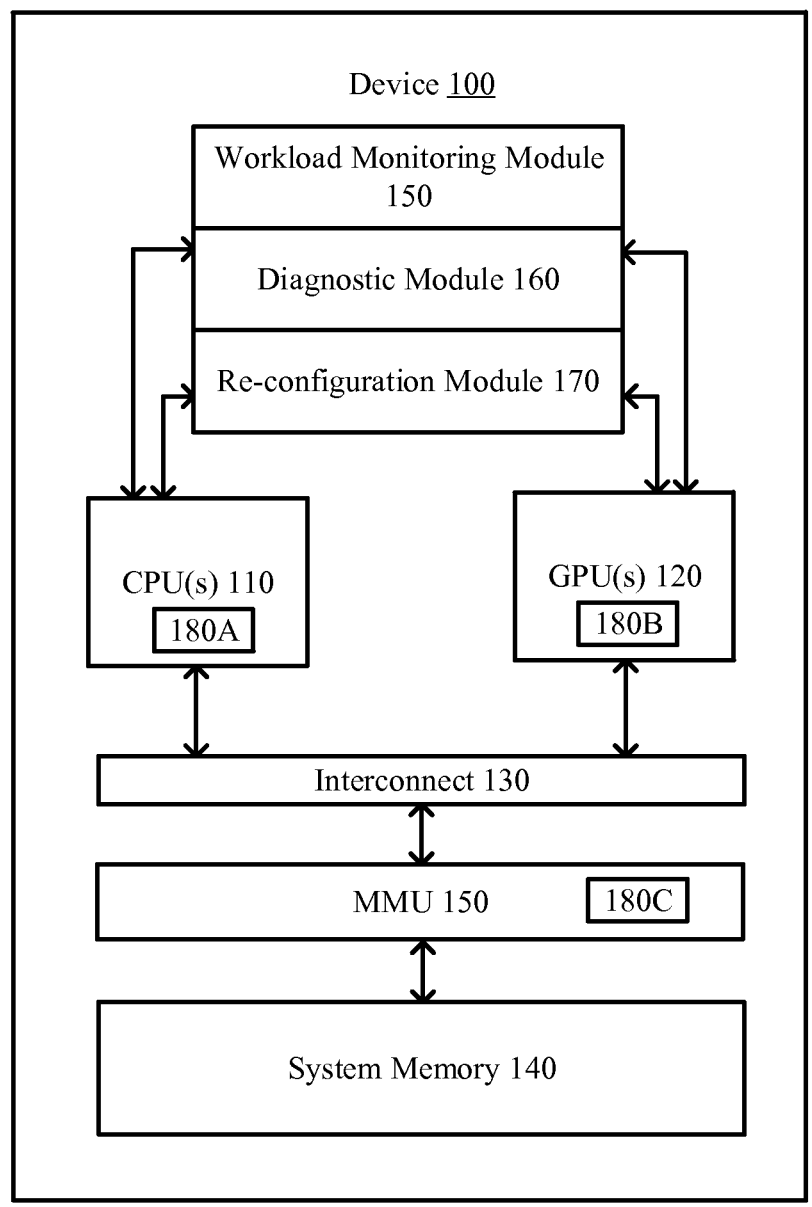
FIG. 1 illustrates an example of a device that performs dynamic data collection according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a method and system that enable a device to monitor and tune its runtime performance while continuously executing an application, such as a graphics application or any computing application. The method and system perform dynamic data collection for performance events at runtime without restarting the application, as long as the workload of the application stays at substantially the same level. The data collection is dynamic because the system can adjust, at runtime, which performance events to monitor as data is collected and analyzed.

In one embodiment, the system (also referred to as a device) collects data of high-level performance events, analyzes the data in real-time, and re-configures the device hardware (e.g., performance counters) based on the analysis results to collect data of lower-level performance events.

The process of data collection, data analysis and hardware reconfiguration may repeat for different levels of performance events until a terminating condition occurs. In one embodiment, performance events are organized as a hierarchical structure with multiple levels. Lower-level performance events are more specific than higher-level performance events with respect to the cause for a performance bottleneck. For example, a user may experience a performance bottleneck in the form of low throughput or long response time. The cause for the performance bottleneck, at a high level, may be low utilization of computing resources. This "low utilization of computing resources" is a high-level performance event that indicates one possible cause for the performance bottleneck. To diagnose the cause for the low utilization, runtime data is collected from various computing resources, and real-time analysis is performed on the collected data. Based on the analysis, it may be determined that the low utilization is caused by a stalled pipeline. This "stalled pipeline" is a lower-level performance event which indicates a more specific cause for the performance bottleneck as well as a cause for the low utilization.

As mentioned before, the number of possible causes for a performance bottleneck is far greater than the number of performance counters in the device. When a different performance event is targeted for diagnosis, the performance counters are re-configured to collect the runtime data from a different set of computing resources or other performance indicators. In one embodiment, the re-configuration of performance counters may be performed while the application continues to be executed, as long as there is no workload change during the execution. Thus, when the workload stays substantially the same, the application can continuously run without interruption while the runtime data is being collected and analyzed for different levels of performance events. Once a specific cause for the performance bottleneck is identified, the device can be re-configured to tune its performance for the application being executed. In one embodiment, the device re-configuration is performed at runtime without interruption to the execution of the application.

For example, the high-level performance events may include, but are limited to, compute unit (CU) utilization events, memory latency events, and the like. Examples of the lower-level performance events may include, but are not limited to, CU starvation, low cache hits, resource conflicts, pipeline stalls, and the like. A CU is a functional unit in a central processing unit (CPU), graphics processing unit (GPU), a digital signal processor (DSP), or other types of computing engine. Examples of the CUs include, but are not limited to, vector processors (e.g., vector shader, vertex shader, etc.), pixel processors (e.g., pixel shader, fragment shader, etc.), compute processors (e.g., compute shader), and fixed pipelined logic for specific functions or features such as copy engines.

To ensure that the workload stays substantially the same when the device collects and analyzes data for various levels of performance events, the device monitors the application execution to detect workload changes. In one embodiment, the device monitors a number of workload indicators to detect whether the amount or characteristics of workload have changed. As long as the amount and characteristics of the workload stay substantially the same, the device may continue its task of runtime data collection and analysis. However, when the workload changes, the cause for the performance bottleneck may also change, which means that the previously-collected runtime data may no longer be useful for finding out the current cause for the performance bottleneck. Thus, once a workload change is detected, the data collection is reset and restarted from the highest-level performance events. Meanwhile, the execution of the application continues without interruption when the data collection is reset and restarted.

For graphics applications, the method and system described herein exploit similarity in the rendered frames that are proximate (i.e., adjacent) in the time domain. Similar frames usually encounter the same GPU pipeline bottlenecks and consume similar resources. Thus, as long as the amount and characteristics of the graphics workload stays substantially the same, the dynamic data collection can be performed and the GPU can be tuned while the graphics application is continuously running. Although graphics application are described as an example, it is understood that the method and system described herein can be applied to any applications that perform computations.

FIG. 1 illustrates a device 100 according to one embodiment. The device 100 includes one or more GPUs 120, one or more CPUs 110, and may additionally include other processing units such as one or more digital signal processors (DSPs). In some embodiments, the GPUs 120 and CPUs 110 may be integrated into a system-on-a-chip (SoC) platform. The GPUs 120 and CPUs 110 communicate with each other and a system memory 140 through an interconnect 130. Access to the system memory 140 is managed by a memory management unit (MMU) 150.

In one embodiment, the device 100 may be part of a mobile computing and/or communication device (e.g., a smartphone, a tablet, a laptop, a gaming device, etc.). In one embodiment, the device 100 may a computing system such as a desktop computing system, a server computing system, a cloud computing system, or the like.

As an example, the GPU 120 performs a sequence of processing steps to create a 2D raster representation of a 3D scene. These processing steps are referred to as 3D graphics pipelining or rendering pipelining. The 3D graphics pipelining turns a 3D scene (which can be a 3D model or 3D computer animation) into a 2D raster representation for display. The 3D graphics pipelining is composed of a number of CUs, which include a combination of fixed-function hardware tailored for speeding up the graphics computations, and general-purpose programmable hardware to allow flexibility in graphics rendering. The general-purpose programmable hardware is also referred to as shader hardware. In addition to rendering graphics, shader hardware can also perform general computing tasks.

In one embodiment, when the GPU 120 executes a graphics application, it generates a sequence of rendered frames as output. Typically, adjacent frames in time have similar features, such as similar numbers of pixels, similar numbers of vertices, or similar hardware states (e.g., shader context). The GPU 120 renders these similar adjacent frames by utilizing substantially the same resources such as memory and CUs, and incurs substantially the same performance events and performance bottlenecks. Thus, the device 100 may collect runtime data of the GPU 120 to tune its performance while continuously executing the graphics application. The same principle applies to other processing units (e.g., the CPUs 110 or DSPs) performing general or special-purpose operations.

In one embodiment, the device 100 includes a workload monitoring module 150 coupled to the CPUs 110 and/or the GPUs 120 to monitor workload changes when the device 100 is executing an application. For the GPUs 120, an example of a workload change is when the currently rendered frames have stopped being similar to the previously rendered frames; e.g., with respect to the number of pixels, the number of vertices, or the hardware states. Thus, the collected data from the performance events of previously rendered frames can no longer be used for tuning the current performance. When the workload monitoring module 150 detects a workload change, the runtime data collection will be reset and restarted from the highest level of performance events while the application continues to run. In one embodiment, the workload monitoring module 150 detects workload changes based on one or more workload indicators. For graphics applications, examples of workload indicators include, but are not limited to, a vertex count, a pixel count, a shader context (e.g., shader instruction type or count, shader input texture type or count, shader input vertex or pixel count, etc.), and the like.

In one embodiment, the device 100 also includes a diagnostic module 160 coupled to the CPUs 110, GPUs 120, and the MMU 150 to receive collected runtime data of performance events. The CPUs 110, GPUs 120, and the MMU 150 may have embedded device hardware 180A, 180B and 180C, respectively, such as performance counters, to collect the data from the respective processing units. The device 100 may include additional processing units or modules from which the diagnostic module 160 may receive the collected data. From the collected data, the causes for performance bottlenecks may be determined. The diagnostic module 160 performs real-time analysis on the collected data, and identifies one or more performance events for which to collect additional data.

In one embodiment, the device 100 further includes a re-configuration module 170 coupled to the device hardware 180A, 180B and 180C to re-configure the device hardware to collect the additional data based on the analysis of the diagnostic module 160. After the specific cause of the performance bottleneck is identified, the re-configuration module 170 may re-configure the hardware and/or software settings at runtime to tune the performance of the device for executing the application, without restarting the application. For example, the re-configuration module 170 may adjust the hardware settings to turn off certain features, such as coarse Z-test in graphics processing, or may adjust the software settings such as command parameters in the drivers; e.g., change texture or color format, split commands into groups, etc.

Although the workload monitoring module 150, the diagnostic module 160 and the re-configuration module 170 are shown as functional blocks outside of the CPUs 110, GPUs 120 and the system memory 140, it is understood that in some embodiments the modules 150, 160 and 170 may include hardware, software, firmware, or a combination thereof, and may partially or wholly reside in the CPUs 110, GPUs 120, the system memory 140, as well as other types of memory, processing units, control units, and computing hardware in the device 100.

Figure 2:
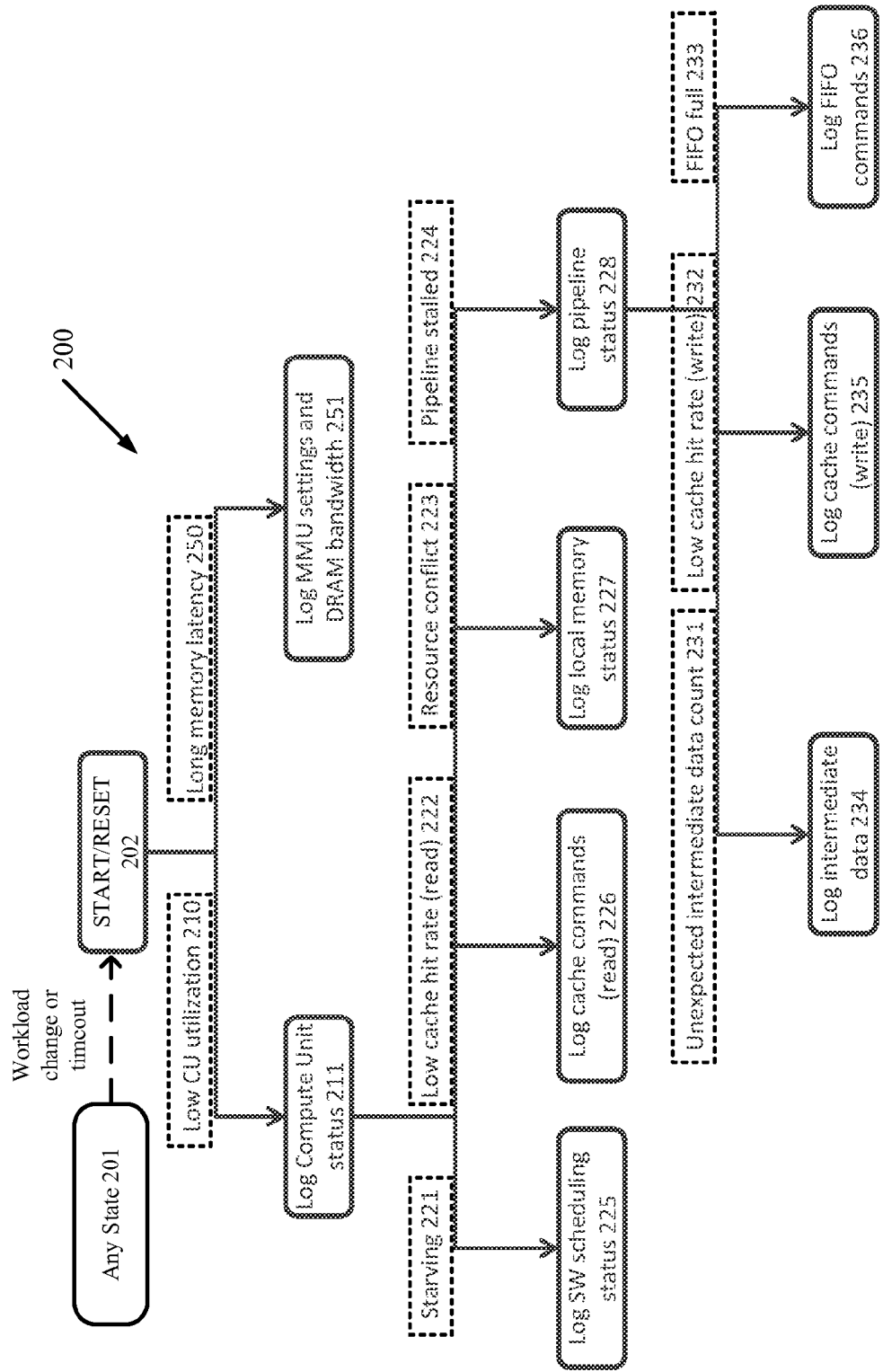
FIG. 2 illustrates an example of performance events organized as a hierarchical structure according to one embodiment.

FIG. 2 illustrates an example of performance events organized as a hierarchical structure 200 according to one embodiment. The diagnostic module 160 performs diagnostic tasks from the top of the hierarchical structure 200 toward the bottom of the structure 200 to find the cause of a performance bottleneck. The diagnosis starts from a start state 202 where the data collection hardware is reset. In some embodiments, the diagnosis may transition into the start state 202 from any state 201 (shown as the dotted connection between state 201 and 202) when a workload change is detected or a timer for that state 201 expires. In this example, the dotted blocks represents performance events, such as low CU utilization 210 and long memory latency 250 at the $1^{st}$ (i.e., highest) level. These performance events indicate alternative causes of a performance bottleneck. The lower-level performance events are more specific than the higher-level performance events; for example, each of the $2^{nd}$ level performance events, including: starving 221, low cache hit rate (on read) 222, resource conflict 223 and pipeline stalled 224 provides additional information for low CU utilization 210, and therefore, indicates a more specific cause for the performance bottleneck. The hierarchical structure 200 in this example also includes a $3^{rd}$ level under the pipeline stalled 224, including: unexpected intermediate data count 231, low cache hit rate (on write) 232, and FIFO full 233. Associated with each performance event in the structure 200 are one or more performance objects to be monitored or logged (represented by blocks with solid lines) by the diagnostic module 160. For example, the diagnostic module 160 may: log the status of one or more compute units 211 in the event of low CU utilization 210; log MMU settings and dynamic random access memory (DRAM) bandwidth in the event of long memory latency 250; log cache commands associated with read operations 226 in the event of low cache hit rate (on read) 222; log local memory status 227 in the event of resource conflict 223. Under the event of pipeline stalled 224, the hierarchical structure 200 also indicates logging the performance objects of: software (SW) scheduling status 225 (for starving 221), pipeline status 228 (for pipeline stalled 224), intermediate data 234 (for unexpected intermediate data count 231), cache commands associated with write operations 235 (for low cache hit rate (on write) 232), and FIFO commands 236 (for FIFO full 233).

As used herein, the term "log" equivalent to "collect runtime data" or "collect . . . at runtime." For example, "log memory status" is equivalent to "collect runtime data of memory status" or "collect memory status at runtime."

Following the hierarchical structure 200, the runtime data of the highest-level performance events is collected, real-time analysis is performed on the collected data, and one of the performance events is identified as most relevant to the performance bottleneck based on the analysis. Then device hardware is re-configured to collect runtime data of lower-level performance events that are under the identified performance event. The level-by-level operations proceed until one of the following terminating condition is satisfied: a specific cause of the performance bottleneck is identified, the bottom-level of the structure 200 is reached, a workload change is detected, or time-out.

In one embodiment, performance counters are used to provide the status of computing and memory resources in the device 100. The counter data provides information about performance bottlenecks and helps to fine-tune the system and application performance. As both the number of counters and the space for storing counter data in the device 100 are limited, the performance counters cannot track the status of all of the resources and activities in the device 100 at the same time. Thus, in each time period, only a subset of performance objects is monitored. As described in connection with FIG. 2, the decision as to which subset to collect is guided by the hierarchy of performance events. Each time a subset of performance events are identified to be the potential causes for the performance bottleneck, the device hardware is re-configured such that the most relevant runtime data can be collected and analyzed.

Figure 3:
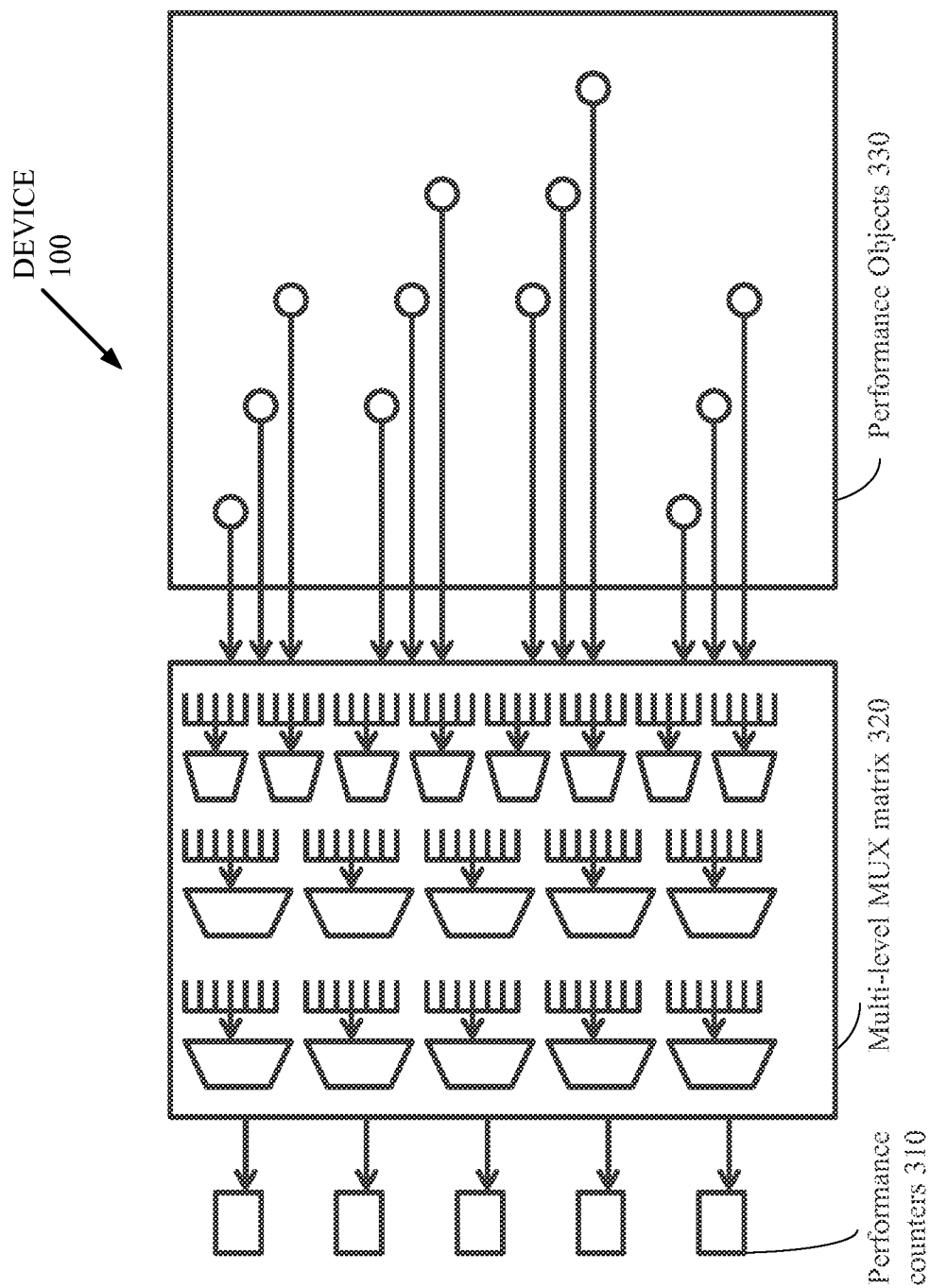
FIG. 3 illustrates a hardware configuration for dynamic data collection according to one embodiment.

FIG. 3 illustrates a configuration of the hardware in the device 100 for runtime data collection according to one embodiment. On the left-hand side of FIG. 3 are performance counters 310; it is understood that the device 100 may include any number of performance counters. On the right-hand side are performance objects 330, such as the status of compute units, pipelines, memory units, caches, and commands, etc. Each performance event is associated with one or more of the performance objects. Thus, monitoring a different performance event means monitoring a different set of performance objects. Between the performance counters 310 and the performance objects 330 is a multi-level multiplexer (MUX) matrix 320, which is configurable at runtime to allow different sets of performance objects to be monitored and their data to be collected. In one embodiment, every time before the data of a new set of performance events is collected, the MUX matrix 320 is re-configured such that the performance counters 310 are used to collect data for the appropriate subset of performance objects 330. In some embodiments, "configuring or re-configuring performance counters" may be understood as equivalent to "configuring or re-configuring the MUX matrix 320." In alternative embodiments, "configuring or re-configuring performance counters" may be understood as equivalent to "selectively enabling runtime data collection from a subset of performance objects that correspond to a subset of performance events."

Figure 4:
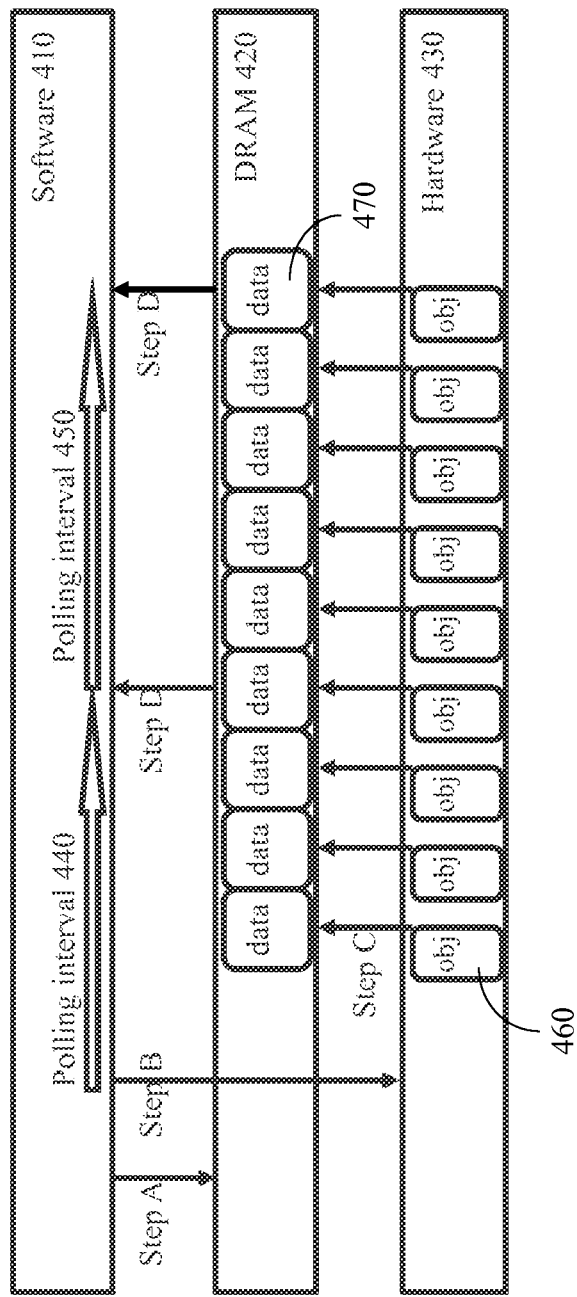
FIG. 4 illustrates an example of software and hardware collaboration for dynamic data collection according to one embodiment.

FIG. 4 illustrates an example of software and hardware collaboration within the device 100 for dynamic data collection according to one embodiment. To collect runtime data, a software layer 410 allocates buffer space in DRAM 420 (e.g., the system memory 140 of FIG. 1) in step (A). Alternatively, a portion of the device's on-chip static random access memory (SRAM), registers, or D flip-flops circuitry within the SOC may be designated for use of the buffer space. In step (B), the software 410 resets hardware 430 and configures the hardware 430, to send collected data objects 460 from the hardware 430 to the buffer space such as the DRAM 420, on-chip memory, or circuitry. In one embodiment, the collected data objects 460 are the performance counter data. In step (C), the hardware 430 writes runtime data 470 into the buffer space after a defined time period. In step (D), the software 410 waits for a polling interval 440 and reads back all valid data 470 in the buffer space. The steps (A)-(D) repeat for a second polling interval 450 and continue until a terminating condition is met.

Figure 5:
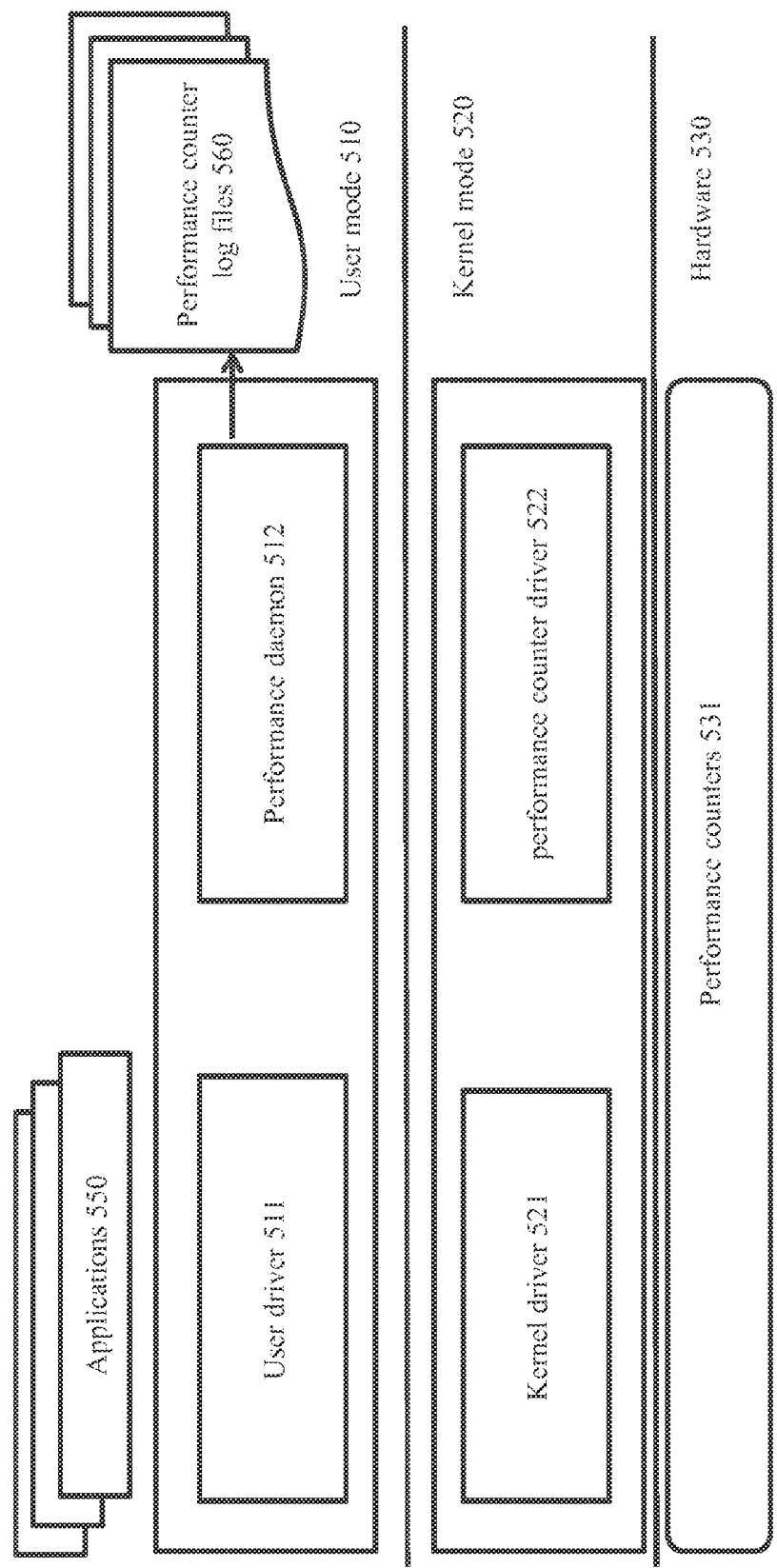
FIG. 5 illustrates an example of software layers used in dynamic data collection according to one embodiment.

FIG. 5 illustrates an example of software layers (e.g., the software 410) used by the device 100 for dynamic data collection according to one embodiment. The software layers include a user mode 510 and a kernel mode 520. A number of applications 550 are executed in the user mode 510. The user mode 510 further includes a user driver 511 and a performance daemon 512. The kernel mode 520 further includes a kernel driver 521 and a performance counter driver 522. Under the software layers is a hardware layer 530 that includes performance counters 531 and other device hardware. For simplicity, not all software and hardware components in the device 100 are shown.

In one embodiment, the performance counter driver 522 performs the software 410 operations described in connection with FIG. 4. In an alternative embodiment, the performance daemon 512 performs the software 410 operations described in connection with FIG. 4. In yet another embodiment, the performance counter driver 522 and the performance daemon 512 in combination perform the software 410 operations described in connection with FIG. 4. In one embodiment, after the runtime data is collected, the collected data is stored in performance counter log files 560 accessible by the performance daemon 512 for identifying the cause of performance bottleneck and for performance tuning.

In the embodiment of FIG. 5, the user driver 511 and the kernel driver 521 manage the address space for the applications 550 and the operating system, respectively. The user driver 511 and the kernel driver 521 may also manage the communication between the hardware 530 and the applications 550 and the operating system, respectively.

Referring also to FIG. 1, in one embodiment, the operations of workload monitoring module 150, the diagnostic module 160, and the re-configuration module 170 may be performed by the performance counter driver 522, the performance daemon 512, or a combination of both modules, in addition to device hardware such as performance counters 531. In one embodiment, the user mode 510 and the kernel mode 520 may be software executed by the CPUs 110, the GPUs 120, or a combination of both.

Figure 6:
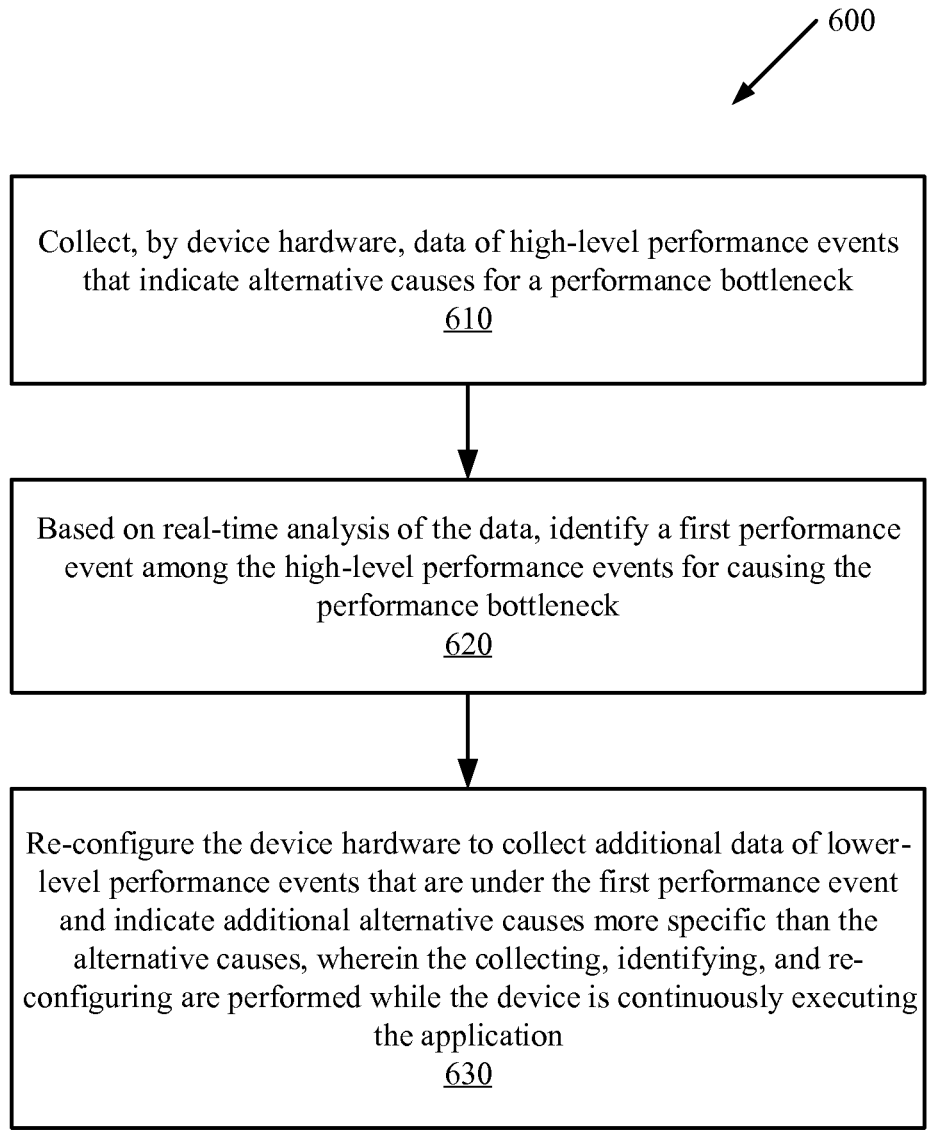
FIG. 6 is a flow diagram illustrating a method for dynamic data collection according to one embodiment.

FIG. 6 is a flow diagram illustrating a method 600 for dynamic data collection in a device while the device is executing an application according to one embodiment. The method 600 may be performed by a computing system, such as the device 100 of FIG. 1. Referring to FIG. 6, the method 600 begins with the device hardware collecting data of high-level performance events that indicate alternative causes for a performance bottleneck (step 610). Based on real-time analysis of the data, the device 100 identifies a first performance event among the high-level performance events for causing the performance bottleneck (step 620). The device 100 then re-configures its hardware to collect additional data of lower-level performance events that are under the first performance event and indicate additional alternative causes more specific than the alternative causes (step 630). The collecting, identifying, and re-configuring are performed while the device 100 is continuously executing the application (step 630).

The operations of the flow diagram of FIG. 6 have been described with reference to the exemplary embodiments of FIG. 1. However, it should be understood that the operations of the flow diagram of FIG. 6 can be performed by embodiments of the invention other than those discussed with reference to FIG. 1, and the embodiments discussed with reference to FIG. 1 can perform operations different than those discussed with reference to the flow diagram. While the flow diagram of FIG. 6 shows a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for dynamic performance monitoring and tuning a device while the device is executing an application, comprising:

collecting, by performance counters embedded in device hardware, data of a subset of performance events which are high-level performance events, wherein the high-level performance events indicate alternative causes for a performance bottleneck;

identifying, based on real-time analysis of the data, a first performance event among the high-level performance events for causing the performance bottleneck during the continuous execution of the application;

re-configuring, during the continuous execution of the application, the device hardware such that the same performance counters are used to collect additional data of a next subset of the performance events, wherein the next subset includes lower-level performance events that are under the first performance event in a hierarchical structure and indicate additional alternative causes more specific than the alternative causes; and tuning the performance of the device with respect to a second performance event identified among the lower-level performance events during the continuous execution of the application, wherein the performance events are organized in the hierarchical structure with the high-level performance events at a top of the hierarchical structure, and wherein the same performance counters operate at one level of the hierarchical structure at a time from the top toward bottom of the hierarchical structure.

2. The method of claim 1, further comprising:
monitoring a plurality of indicators of workload change when executing the application; and
resetting data collection and execution of the application when one or more of the indicators indicate a workload change.

3. The method of claim 2, wherein resetting the data collection further comprises:
restarting data collection when one or more of the indicators indicate a workload change.

4. The method of claim 2, wherein the indicators include at least one of: a vertex count, a pixel count, and a shader context.

5. The method of claim 1, wherein the high-level performance events includes compute unit utilization events and memory latency events.

6. The method of claim 1, wherein the identifying and re-configuring are performed by an embedded software driver that runs in a kernel mode.

7. The method of claim 1, wherein the identifying and re-configuring are performed by an embedded software daemon that runs in a user mode.

8. The method of claim 1, wherein collecting the data further comprises:
resetting the performance counters in the device hardware;
configuring the performance counters to collect the data of the high-level performance events into a buffer space; and
retrieving the data from the buffer space after a polling interval.

9. A device to perform dynamic performance monitoring and tuning, comprising:
one or more processors operative to execute an application;
device hardware including performance counters operative to collect, during continuous execution of the application, data of a subset of performance events which are high-level performance events, wherein the high-level performance events indicate alternative causes for a performance bottleneck;
a diagnostics module coupled to the device hardware, wherein the diagnostics module is operative to identify, based on real-time analysis of the data, a first performance event among the high-level performance events for causing the performance bottleneck during the continuous execution of the application; and
a re-configuration module coupled to the device hardware, wherein the re-configuration module is operative to re-configure, during the continuous execution of the application, the performance counters such that the same performance counters are used to collect additional data of a next subset of the performance events, wherein the next subset includes lower-level performance events that are under the first performance event in a hierarchical structure and indicate additional alternative causes more specific than the alternative causes,
wherein the one or more processors are operative to: tune the performance of the device with respect to a second performance event identified among the lower-level performance events during the continuous execution of the application, and
wherein the performance events are organized in the hierarchical structure with the high-level performance events at a top of the hierarchical structure, and wherein the same performance counters operate at one level of the hierarchical structure at a time from the top toward bottom of the hierarchical structure.

10. The device of claim 9, further comprising a workload monitoring module operative to:
monitor a plurality of indicators of workload change when executing the application; and
reset data collection and execution of the application when one or more of the indicators indicate a workload change.

11. The device of claim 10, wherein the workload monitoring module is further operative to restart data collection when one or more of the indicators indicate a workload change.

12. The device of claim 10, wherein the indicators include at least one of: a vertex count, a pixel count, and a shader context.

13. The device of claim 9, wherein the high-level performance events includes compute unit utilization events and memory latency events.

14. The device of claim 9, wherein the one or more processors are operative to execute an embedded software driver that runs in a kernel mode to perform operations of the diagnostic module and the re-configuration module.

15. The device of claim 9, wherein the one or more processors are operative to execute an embedded software daemon that runs in a user mode to perform operations of the diagnostic module and the re-configuration module.

16. The device of claim 9, wherein the one or more processors include at least one of a graphics processing unit (GPU) and a central processing unit (CPU).

* * * * *